United States Patent Office 3,146,269
Patented Aug. 25, 1964

3,146,269
BIS(O-HYDROXYBENZOYL)PHENYL COMPOUNDS
Harry Braus, Springdale, and Otto A. Homberg, Woodlawn, Ohio, assignors to National Distillers and Chemical Corporation, New York, N.Y., a corporation of Virginia
No Drawing. Filed Nov. 10, 1960, Ser. No. 68,349
2 Claims. (Cl. 260—591)

This invention is concerned with bis(o-hydroxybenzoyl)phenyl compounds and, more specifically, with bis(o-hydroxybenzoyl)phenyl compounds having the formula

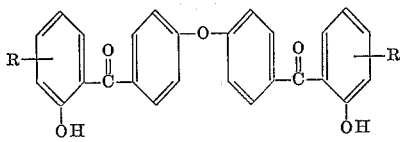

In this and succeeding formulas R represents hydrogen or an alkyl or an alkoxy group. This application is a continuation-in-part of our copending application Serial No. 851,015, filed November 5, 1959 (abandoned).

It is an object of this invention to provide new and novel bis(o-hydroxybenzoyl)phenyl compounds.

It is a further object of this invention to provide bis(o-hydroxybenzoyl)phenyl compounds to be used as ultraviolet (UV) light absorbers in resinous compositions.

Other objectives of the invention will become apparent from the detailed description set forth below.

It has now been discovered that new and novel compounds may be prepared by reacting diphenyl oxide with at least two molar equivalents of o-methoxybenzoyl chloride, o-methoxybenzoyl chloride substituted with an alkyl group containing 1 to 8 carbon atoms, or o-methoxybenzoyl chloride substituted with an alkoxy group containing 1 to 8 carbon atoms. The reaction may be represented by the following equation:

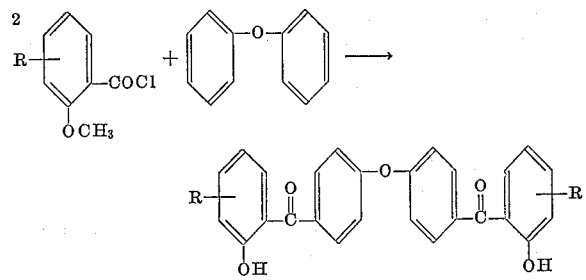

When alkyl- or alkoxy-substituted o-methoxybenzoyl chloride is employed, the resulting compound is likewise alkyl- or alkoxy-substituted.

In the preparation of the bis(o-hydroxybenzoyl)phenyl compounds as embodied herein, the starting materials may be obtained by any known and convenient method.

The operable temperature range for the reaction of the present invention depends upon the reactants employed. In general, however, the reaction temperature is between the melting point and the boiling point of the selected solvent. The reaction proceeds smoothly in the presence of a Friedel-Crafts catalyst, such as, for example, anhydrous aluminum chloride, titanium tetrachloride, zirconium tetrachloride, boron trifluoride, boron trichloride, and the like, or mixtures thereof. At least four molar equivalents of the catalyst are used, two equivalents being required to bring about the condensation and two equivalents being required for the demethylation of the o-methoxy group. The reaction is carried out in the presence of an inert organic solvent such as a Friedel-Crafts solvent, for example, chlorobenzene, carbon disulfide, chloronaphthalene, and the like, or mixtures thereof. Under these conditions, the alkoxy groups in other than the ortho position are unaffected by the catalyst, while the alkoxy group in the ortho position is converted to a hydroxyl group. In order for the material to be effective as a UV light absorber, the final product must have at least one hydroxyl group in a position ortho to a ketonic carbonyl group.

In carrying out the reaction, a mixture of the hydrocarbon, o-methoxybenzoyl chloride which may be alkyl- or alkoxy-substituted if desired, and a suitable solvent is cooled to about 0° to about 20° C. and treated with a Friedel-Crafts catalyst while maintaining the temperature below about 20° C. The resulting solution is then warmed to about the boiling point of the selected solvent and decomposed, for example with ice and concentrated hydrochloric acid; the resulting mixture is heated, if necessary, to dissolve the solids present. The organic layer is separated, washed with hot water, and treated with a caustic alkali, such as 10% aqueous sodium hydroxide or potassium hydroxide. The solvent is removed by any convenient means, such as by steam distillation. The alkaline residue is then filtered; heated; acidified, for example with concentrated hydrochloric acid; and cooled to room temperature. The residue is then collected by filtration and recrystallized from alcohol.

In an alternative procedure, a mixture of the hydrocarbon, Friedel-Crafts catalyst, and solvent is cooled to about 0° to about 5° C. A solution of o-methoxybenzoyl chloride or a substituted o-methoxybenzoyl chloride in a suitable solvent is added dropwise while the temperature is maintained below about 5° C. The temperature is then slowly increased to room temperature. The product is then extracted from the reaction mixture by a procedure such as in the first embodiment.

The products of the present invention are stable, odorless, yellow solids which are soluble in most common organic solvents. They have been found to be effective UV light absorbers, imparting enhanced stability to sunlight to the materials to which they have been added. They are compatible with resinous and plastic compositions of various types, such as polyolefins as for example polyethylene and polypropylene, cellulose, ethyl cellulose, styrene, polystyrene, polyvinyl chloride, acrylonitrile polymers, acrylates such as methyl acrylate and methyl methacrylate, and the like. The addition of a small amount of one of these new compounds to a colorless or light-colored resinous composition, such as, for example, a polypropylene resin, successfully protects the resin from photooxidation and substantially eliminates yellowing of the resin in a cured state upon prolonged exposure to UV light; the addition of one of these new compounds does not, however, inhibit in any way the gelation and cure rate of the resinous material. The solubility, dispersibility, and compatibility of UV light absorbers in resinous compositions apparently have a strong influence on the effectiveness of these absorbers, and the compounds of the present invention have been found to be quite compatible with, and dispersible in, polyethylene and polypropylene. The elimination of photo-oxidation with its attendant prevention of color deterioration, retention of elongation, and improvement in dielectric properties and melt index, plus the lack of odor of these new compounds, are particularly important when dealing with a resinous material which is intended to be fabricated for example into an article of clothing, such as rainwear, or into a packaging film for foods or the like, where clear plastic articles which retain their clarity upon prolonged exposure to the sun's rays are desired. The amount of the UV light absorber which may be used to protect the resinous material may vary between about 0.01 and about 5 percent by weight, based on the total weight of the resin solids; optimum protection is given when the amount of UV light absorber is about 0.01 to about 1.0 percent by weight. It is possible to use these compounds in conjunction with other stabilizers.

The effectiveness of these new compounds as UV light absorbers may be demonstrated by the following data:

*Table I*

| Compound [1] | Isooctane | | Toluene | | Ethyl Acetate | |
|---|---|---|---|---|---|---|
| | λmax.[2] | εmax.[3] | λmax. | εmax. | λmax. | εmax. |
| a | 345 mu | −10,900 | 350 mu | −10,800 | 345 mu | −10,650 |

[1] a=bis(p-[o-hydroxybenzoyl]phenyl) oxide.
[2] λmax.=wavelength in near ultraviolet at which maximum absorption takes place.
[3] εmax.=a function of the absorption at λmax.

$$\epsilon max. = \frac{Mol.\ wt. \times \log I/I_0}{g.\ compd./liter}$$

wherein I represents the intensity of the transmitted radiation and $I_0$ represents the intensity of the light source.

Organic compounds are considered effective UV light absorbers when they absorb light rays within the band of about 290 to 370 mu. As can be seen by the data in Table I, the bis(o-hydroxybenzoyl)phenyl compounds of the present invention fall well within this desired range, being most effective at about 350 mu.

The invention will be described in greater detail by the following examples which are illustrative only and are not intended to limit the invention. All parts are expressed by weight unless otherwise specified.

EXAMPLE 1

A mixture of 58.6 parts of o-methoxybenzoyl chloride, 29.2 parts of diphenyl oxide, and 200 parts of chlorobenzene was cooled to 5° C. The mixture was then treated cautiously with 113 parts of aluminum chloride; when the addition was complete, the mixture was heated to 75° C., this temperature being maintained for four hours. The reaction mixture was then decomposed with ice and hydrochloric acid. The organic layer was then separated and washed several times with hot water. It was then treated with 200 parts of 10% sodium hydroxide solution, and the chlorobenzene was removed by steam distillation. The alkaline residue was filtered and acidified with concentrated hydrochloric acid. The resulting precipitate was collected and recrystallized several times from benzene-alcohol to yield bis(p-[o-hydroxybenzoyl]phenyl)oxide, a yellow solid which melts at 122–124° C. and contains 76.33% C (76.09% calculated) and 4.43% H (4.42% calculated).

The bis(o-hydroxybenzoyl)phenyl compounds prepared in accordance with the present invention are unique in that they exhibit unusual ultraviolet transmitting properties when incorporated in any light-transmitting carrier or composition without impairing the stability of said carrier or composition. Thus they may be employed in a wide variety of carrier or filter media, such as solutions or dopes of film-forming materials obtained by the polymerization of ethylene, propylene, styrene, vinyl chloride, vinyl ethers, vinyl esters, acrylic acids, cellulose esters, and the like. In addition these new UV light absorbers may be dispersed in a lacquer, in a transparent interlayer laminate of safety glass, and so forth.

The following example is included to illustrate the use of a bis(o-hydroxybenzoyl)phenyl compound in the preparation of a transparent plastic:

EXAMPLE 2

A polypropylene resin and 0.5 weight percent, based on the total weight of the resin solids, of the bis(o-hydroxybenzoyl)phenyl compound (as a 1 percent solution of the bis(o-hydroxybenzoyl)phenyl compound in acetone) were mixed in a Hobart mixer until all of the acetone had evaporated off (about a half hour). The mixture was then milled on a 2-roll rubber mill at 350° F. for 10 minutes and then compression-molded into 30-mil thick plaques. Tensile specimens cut from the plaques were subjected to ultraviolet light for 500 hours, with observations being taken at the end of each 100-hour period.

*Table II*

EFFECT OF ULTRAVIOLET ABSORBERS IN POLYPROPYLENE

| Run | Ultraviolet Absorber | 50% Retained Elongation | |
|---|---|---|---|
| | | UV Light Exposure Time, Hours | Natural Exposure Time, Months [1] |
| 1 | Bis[p-o-hydroxy-benzoyl]phenyl]-oxide. | 390 | 15.6 |
| 2 | None | 235 | 9.4 |

[1] Estimated. In general 300 hours of UV light exposure is equivalent to about one-year's natural exposure in the North Temperate Zone.

A comparison of the results of Run 1 with those of Run 2 (where no ultraviolet light absorber was used) shows effective protection of the resin from ultraviolet degradation.

While above are disclosed but a limited number of embodiments of the invention presented herein, it is possible to produce still other embodiments without departing from the inventive concept. It is desired, therefore, that only such limitations be imposed upon the appended claims as are stated therein.

What is claimed is:

1. A chemical compound having the structural formula

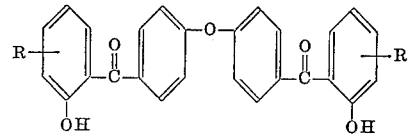

wherein R represents a member of the group consisting of hydrogen, an alkyl radical containing 1 to 8 carbon atoms, and an alkoxy radical containing 1 to 8 carbon atoms.

2. Bis(p-[o-hydroxybenzoyl]phenyl)oxide.

References Cited in the file of this patent

UNITED STATES PATENTS

| 2,773,903 | Hardy et al. | Dec. 11, 1956 |
| 2,853,521 | Hardy et al. | Sept. 23, 1958 |
| 2,861,053 | Lappin et al. | Nov. 18, 1958 |
| 2,900,361 | Havens | Aug. 18, 1959 |